(12) United States Patent
Weiss

(10) Patent No.: US 7,390,550 B2
(45) Date of Patent: Jun. 24, 2008

(54) COASTER COMPRISING A COMPACT DISC

(75) Inventor: Volker Weiss, Berlin (DE)

(73) Assignee: DOCdata Germany Berlin Optical Disc GmbH, Berlin (DE)

(*) Notice: Subject to any disclaimer, the term of this patent is extended or adjusted under 35 U.S.C. 154(b) by 267 days.

(21) Appl. No.: 11/344,954

(22) Filed: Feb. 1, 2006

(65) Prior Publication Data

US 2007/0048484 A1    Mar. 1, 2007

(30) Foreign Application Priority Data

Feb. 1, 2005   (DE) .................. 20 2005 001 652 U

(51) Int. Cl.
*A47G 23/03*   (2006.01)
(52) U.S. Cl. .................... 428/64.4; 248/346.11
(58) Field of Classification Search ............. 428/64.4, 428/64.1; 248/346.11; 206/308.1; 720/725
See application file for complete search history.

(56) References Cited

U.S. PATENT DOCUMENTS

2006/0060743 A1* 3/2006 Kelley et al. ........... 248/346.11

* cited by examiner

*Primary Examiner*—Alexander Thomas
(74) *Attorney, Agent, or Firm*—Mayer & Williams PC; Karin L Williams, Esq.

(57) ABSTRACT

A beer mat having a compact disc and a beer-mat body, whereby the main surface of the beer-mat body has been provided with a flat recess, whose depth corresponds at least to the thickness of the compact disc, but less than the thickness of the beer-mat body outside of the recess, whereby the compact disc has been inserted into the recess, and with a cover film overspanning the recess and bonded to the main surface of the beer-mat cover outside of the recess, and whereby the perimeter line of the cover film runs outside of the perimeter line of the recess but within the perimeter line of the beer-mat body, so that a ring absorption area is formed.

7 Claims, 2 Drawing Sheets

COASTER COMPRISING A COMPACT DISC

BACKGROUND OF THE INVENTION

The innovation concerns a coaster or beer mat. Beer mats are known in practice and are very generally made of a cardboard material. This material consists of organic fibers which, together with a binding agent, are pressed to form a flat entity. The resulting beer mat has open pores and considerable absorptive capacity, which serves to take up spilled beer or condensed water. The (total) top surface of known beer mats forms an absorptive surface.

It goes without saying, that the application of beer mats is not limited to their use as underlays for beer glasses. Rather, beer mats can be used as underlays for any type of drinking vessel with any type of content. Insofar, the present description uses the expression "beer mat" as a synonym for an absorptive "coaster".

Beer mats are generally formed in a flat way, i.e. they have two main surfaces on their opposing sides. The thickness of a beer mat is typically somewhere in the range of 1 to 5 mm. The peripheral line of a beer mat can generally have any arbitrary form. Besides a circular form or a square shape with rounded edges, polygon forms as well as graphic forms are also known. In the case of graphic forms, objects are schematically imitated, for example, a motor vehicle may be depicted in a silhouette form.

In practice it is known that compact discs are packaged in different ways. Besides packaging them in cassettes made of polymer materials, pouches for CDs are also known, which are made of a paper material and into which a CD can be inserted. Within the scope of the innovation, the term "compact disc" is used to refer to any optical storage medium.

A beer mat containing a CD is known from literature reference EP 1290956 A1. Here the entire surface is covered by a film, with the result that the surface no longer provides any appreciable absorptive capacity.

A postcard with a CD is known from literature reference DE 20021924. Such a postcard does not have an absorptive surface.

Literature reference FR 2762423 reveals a container for a CD with a protective film. An absorptive surface is not provided.

Literature reference DE 201 13 318 U1 describes a beer mat with a CD, whereby the CD is inserted between two layers of beer-mat material and can be retracted from the side. Removing the CD is awkward.

Literature reference U.S. Pat. No. 5,748,608 describes a container for a CD. An absorptive surface is not provided. A similar object can be derived from literature reference DE 20108112 U1.

Literature reference DE 20310242 U1 describes a beer mat with a CD, wherein the CD is completely subjected to the effects of liquids, which has a disturbing effect for obvious reasons.

From literature reference DE 296 11 936 U1 it is known that a CD can be coated with a beer-mat material on the opposite side of the information layer. However, due to their heavy weight and imbalances, such CDs cannot be played on most players. Furthermore, absorbed liquid would be dispersed within the player.

Due to their design, beer mats are collector's items. From other fields it is also known that products are given added value by placing into their packaging other items such as compact discs. In the case of beer mats it appears desirable to make these more attractive to the user.

SUMMARY OF THE INVENTION

The invention is based on the technical problem of providing a beer map with an added-value product, in particular a compact disc, without thereby substantially impairing the beer mat's function to absorb spilled liquids. The invention is further based on the technical problem of having a beer mat with a CD, which must reliably protect the CD when it is used as a beer mat, wherein however, it must be possible to easily remove the CD in an uncomplicated manner.

To solve this technical problem, the invention teaches a beer mat with a compact disc, with a beer-mat body, wherein one of the main surfaces of the beer-mat body is provided with a flat recess, whose depth corresponds at least to the thickness of a compact disc, but which is smaller than the thickness of the beer-mat body outside of the recess, wherein the compact disc is inserted into the recess, and with a cover film that overspans the recess and is joined to the main surface of the beer-mat body outside of the recess, wherein the perimeter line of the cover film is formed outside of the perimeter line of the recess but within the perimeter line of the beer-mat body, so that a ring-absorption area is formed.

The perimeter line of the recess lies outside of the perimeter line of the compact disc and is preferably adapted to the contour, for example with a constant distance of 0.1-2.0 mm between the perimeter lines. The main surface opposing the main surface with the recess is preferably planar.

The ring-absorption surface is preferably 5-90%, particularly 5-40%, of the area of the main surface. The beer-mat body is made of an open-pored cardboard material commonly used for beer mats. The cover film is made preferably of a transparent polymer material that is impervious to water. The cover material is bonded to the beer mat with an adhesive. A protective ring area is formed by the area in which the cover film is bonded to the beer-mat body. Here the distance of the perimeter line of the cover foil to the perimeter line of the recess is preferably in the range of 1-30 mm, preferably 4-20 mm. The distance between the perimeter line of the cover film to the perimeter line of the beer mat can be 1-100 mm, preferably 1-50 mm, and most preferably 1-30 mm.

The invention creates a beer mat that is more interesting to the user, and which also has utilization value. On the one hand, the beer mat together with the CD in it can be kept as a collector's item. On the other hand, the cover film can be easily and simply removed so that the CD can be applied for its intended use. At the same time it is ensured that the beer mat continues to serves its function of absorbing spilled beer, and it does this even when used when with the main surface and cover foil facing upwards, and on the other hand, the dimensions of the beer mat, particularly of the ring-protection area, ensure that the absorbed liquids cannot penetrate through to the compact disc and contaminate it.

A beer mat in compliance with the invention can generally be manufactured in two different ways. In the first embodiment of a manufacturing method, the beer-mat body, including the recess, is manufactured by pressing a mixture of fibers and binding agent in a correspondingly shaped negative form. In a second embodiment of the production process, initially a first beer-mat half-body is manufactured which differs from the beer-mat body in that it is thinner. A recess is punched into the second beer-mat body-half. Both beer-mat body-halves are then bonded together at their flat surfaces, so that a uniform perimeter line of the beer-mat body is obtained. Accordingly, both production variants lead to a beer mat that has a recess. Next, a CD is inserted into the recess and a cover film is then applied or bonded in accordance with the above described instructions.

BRIEF DESCRIPTION OF THE FIGURES

The following describes the invention using just an example of a possible embodiment and some representative diagrams.

DETAILED DESCRIPTION OF THE PREFERRED EMBODIMENTS

Figure 1:
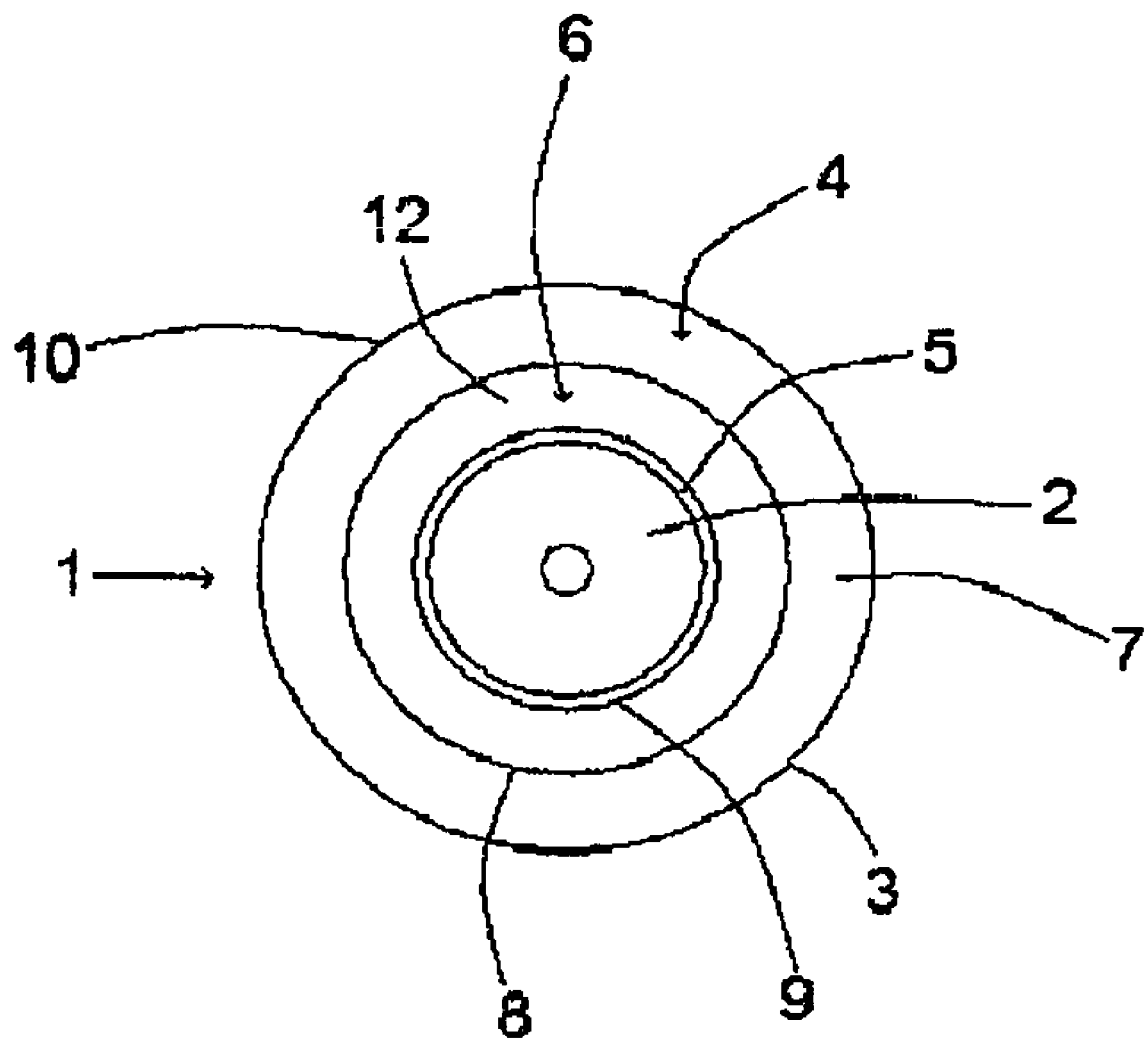
FIG. 1 is a top view of a beer mat in compliance with the invention.

FIG. 1 shows a beer mat 1 with a compact disc 2. The beer mat 1 has a beer-mat body 3, wherein the main surface 4 of the beer-mat body 3 has been provided with a flat recess 5. Its depth corresponds to at least the thickness of the compact disc 2, but it is less than the thickness of the beer-mat body 3 outside of the recess 5. Further reference is made here to the representation in FIG. 2. The compact disc 2 has been placed into the recess 5. Furthermore, a cover film 6 has been provided overspanning the recess 5 and joined to the main surface 4 of the beer-mat body 3 outside of the recess 5. In the representation shown in FIG. 2, the cover film 6 is shown exaggerated in thickness for drawing reasons. Typical thicknesses for a suitable cover film made of polymer materials are in the range 5-1000 μm, in particular 5-100 μm.

Figure 2:
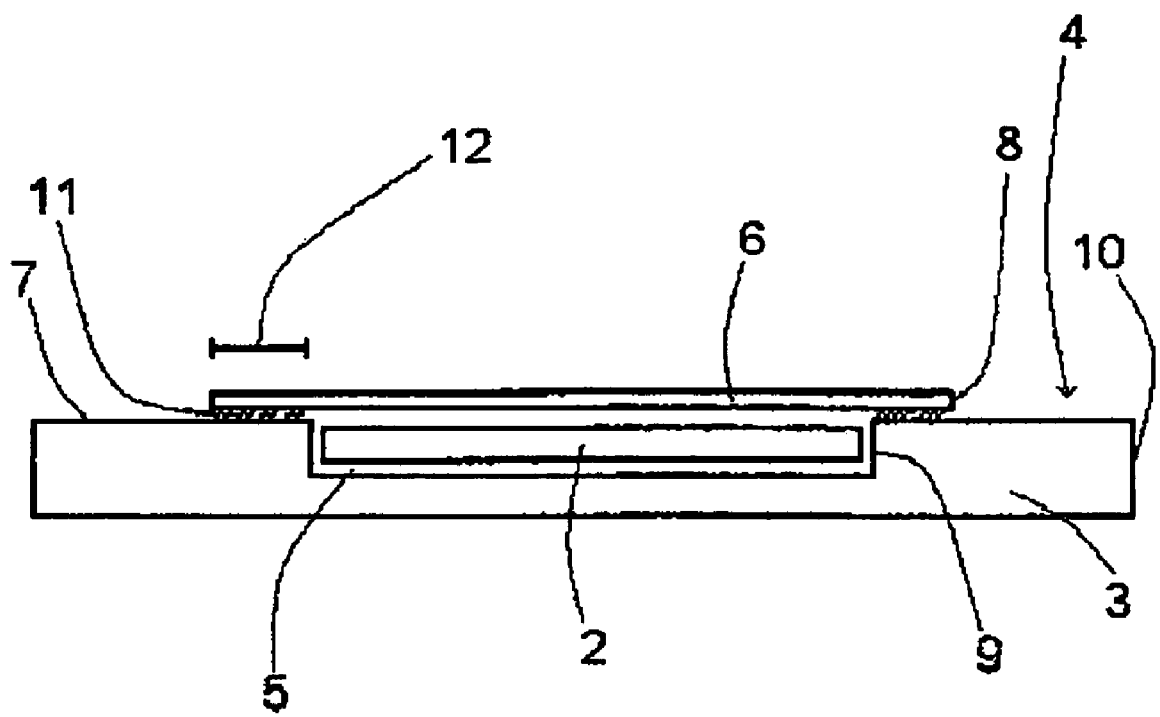
FIG. 2 is a schematic cross-sectional representation of the object in FIG. 1.

From a comparative consideration of FIGS. 1 and 2, it can be seen that the perimeter line 8 of the cover film 6 runs outside of the perimeter line 9 of the recess 5 but within the perimeter line 10 of the beer-mat body 3, resulting in the formation of a ring absorption area 7. This ring absorption area 7 allows the absorption of spilled liquids by the beer mat 1, which is its intended purpose. In the embodiment shown, the ring absorption area 7 amounts to approximately 15% of the area of the main surface 4.

From FIG. 2 it can be seen that the cover film 6 is bonded to the beer-mat body 3 by means of an adhesive 11. The area in which the cover film 6 is bonded to the beer-mat body 3 forms a protective ring surface 12. Here the distance between the perimeter line 8 of the cover film 6 from the perimeter line 9 of the recess 5 is designed in accordance with the instruction that spilled liquids can either only minimally penetrate through to the perimeter line 9 of the recess 5 or not at all. This protects the compact disc 2 from spilled liquids.

Where single-side readable compact discs 2 are involved, it is recommended to arrange the readable side in the recess 5.

The invention claimed is:

1. A beer mat comprising:
   a compact disc; and
   a beer-mat body,
   wherein a main surface of the beer-mat body is provided with a flat recess, whose depth corresponds at least to the thickness of the compact disc, but less than the thickness of the beer-mat body outside of the recess,
   wherein the compact disc has been inserted into the recess, with a cover film overspanning the recess and bonded to the main surface of the beer-mat cover outside of the recess, and
   wherein a perimeter line of the cover film runs outside of a perimeter line of the recess but within a perimeter line of the beer-mat body, so that a ring absorption area is formed.

2. A beer mat according to claim 1, wherein the ring absorption area is 5-90% of the area of the main surface.

3. A beer mat according to claim 1, wherein the beer-mat body is formed with an open-pored cardboard material.

4. A beer mat according to claim 1, wherein the cover film is formed with a preferably transparent polymer material.

5. A beer mat according to claim 1, wherein the cover film is bonded to the beer-mat body by means of an adhesive.

6. A beer mat according to claim 1, wherein a protective ring area is formed in the area in which the cover foil is bonded to the beer-mat body.

7. A beer mat according to claim 2, wherein the ring absorption area is 5-40% of the area of the main surface.

* * * * *